Figure 1:
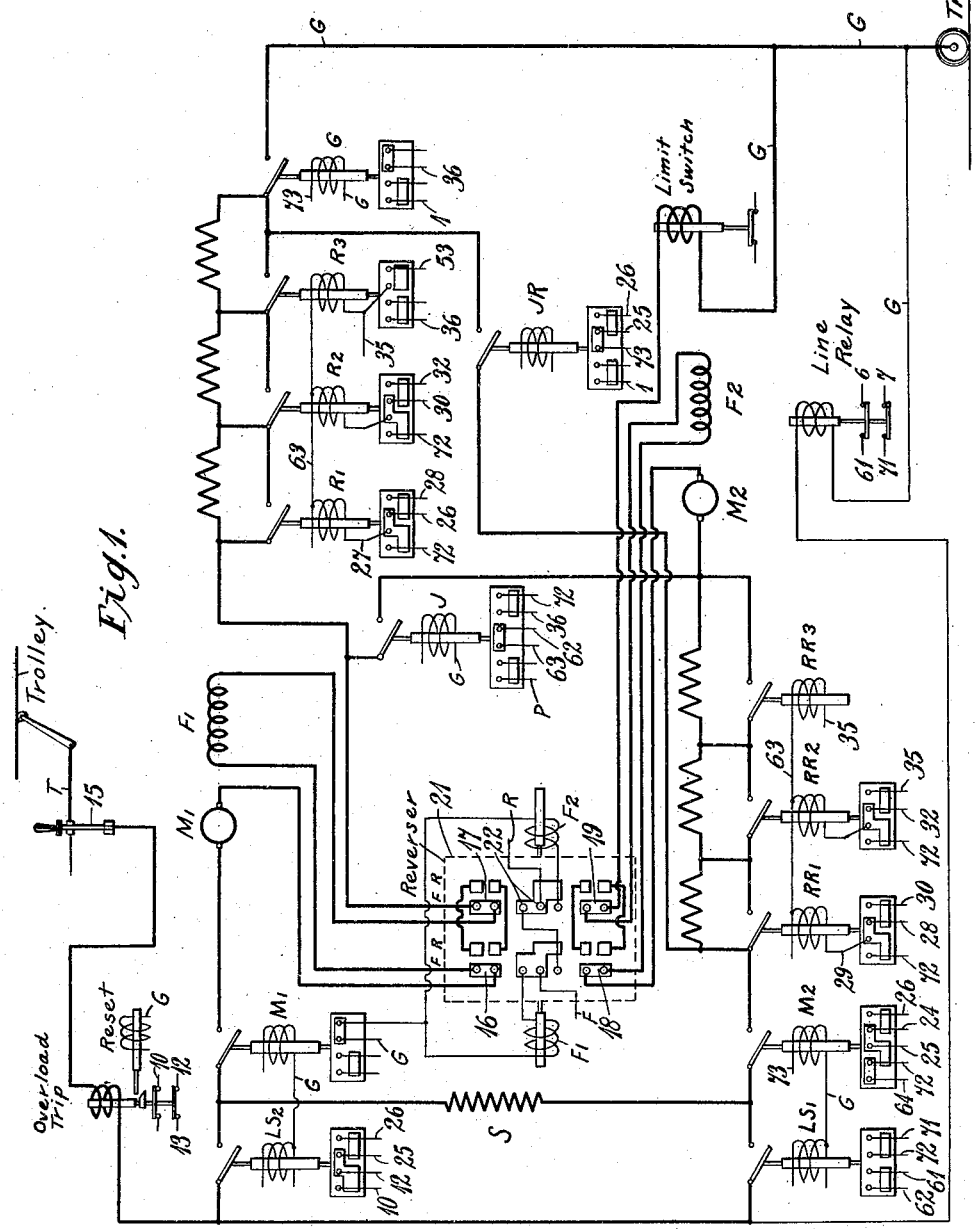

A. J. HALL.
CONTROL SYSTEM FOR ELECTRIC MOTORS.
APPLICATION FILED FEB. 17, 1913.

1,126,198.

Patented Jan. 26, 1915.

A. J. HALL.
CONTROL SYSTEM FOR ELECTRIC MOTORS.
APPLICATION FILED FEB. 17, 1913.
1,126,198.
Patented Jan. 26, 1915.
2 SHEETS—SHEET 2.
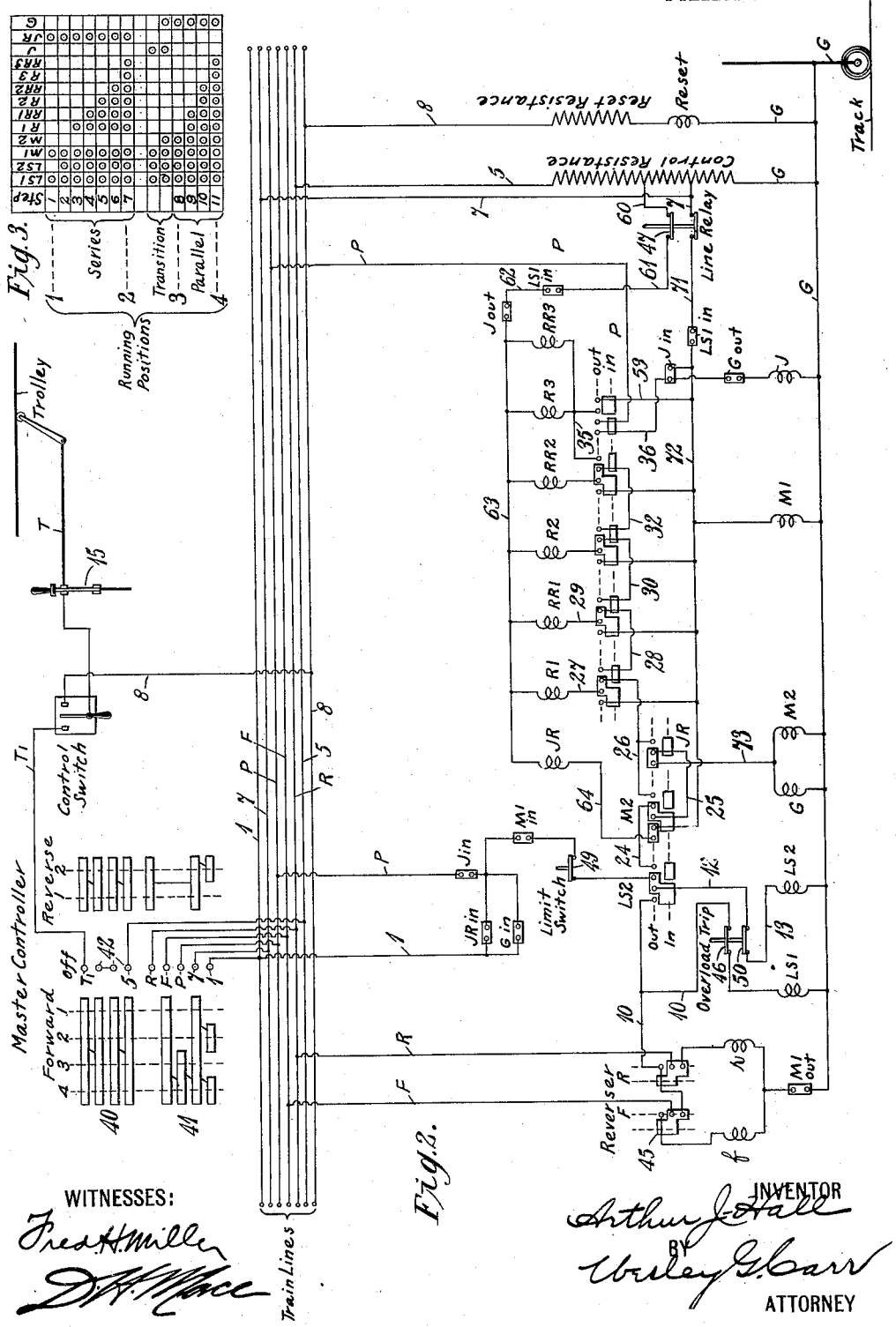

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR ELECTRIC MOTORS.

1,126,198.  Specification of Letters Patent.  Patented Jan. 26, 1915.

Application filed February 17, 1913. Serial No. 748,780.

*To all whom it may concern:*

Be it known that I, ARTHUR J. HALL, subject of King of Great Britain, and a resident of Wilkinsburg, in the county of Allegheny and State of Pennsylvania, have invented a new and useful Improvement in Control Systems for Electric Motors, of which the following is a specification.

My invention relates to control systems for electric motors, and it has particular reference to control systems of the pneumatically-operated multiple unit type that are employed on motor-cars and locomotives which are used on elevated and subway systems and large surface railway electrifications.

One of the objects of my invention is to provide a simple, compact and inexpensive control system which shall be adapted to arrange the circuit connections of a plurality of motors and resistors, whereby said motors may be automatically and smoothly accelerated and changed over from series to multiple relation by means of "bridging" connections.

Another object of my invention is to provide a full automatic system of control that may be readily manipulated and cheaply maintained in operating conditions, and which shall embody an auxiliary low-voltage control system deriving energy indirectly from the supply circuit, whereby the usual train lines and control interlock switches are required to handle only relatively low voltages.

Another object of my invention is to provide a three-wire auxiliary low-voltage control system deriving energy from the supply circuit and to arrange the circuit connections of the various control electro-magnets so that said electro-magnets are divided into two substantially equal groups and connected between the neutral control circuit and the respective outer control circuits, whereby said electro-magnets are operated with positiveness and reliability over a wide range of voltage fluctuations.

A still further object of my invention is to provide a control system embodying relatively few interlock switches and to arrange the same in conjunction with an electro-responsive governing switch, so that the main switches must be closed in a predetermined order and under predetermined circuit conditions, whereby the motors cannot be subjected to injury by reason of excess current.

In the prior art, automatic multiple unit control systems have been provided with auxiliary control circuits receiving their energy from the supply circuit, but, in such cases, the high voltage of the supply circuit has been impressed upon the auxiliary control circuits and hence, the train lines and interlock switches have been required to handle high-voltage currents. Furthermore, the voltage range of operation of the governing electro-magnets has been small and the system could not be depended upon to operate positively in case the voltage of the supply circuit fell any considerable amount.

Pneumatically operated control systems have heretofore been provided with batteries for supplying low-voltage energy to the auxiliary control circuits and have thus provided for positive and reliable operation of the switches, although the batteries required careful attention and added to the weight and maintenance of the equipment.

I propose to combine the advantages of a low-voltage auxiliary control system with those of a system deriving its control energy from the supply circuit and thus secure a system which shall be simple in arrangement and operation and shall operate effectively and positively, under all service conditions, over a wide range of voltage fluctuations.

My invention is particularly applicable to control systems for railway vehicles, although it is not confined to this type of operation and service, and may be employed, if desirable, upon other types of vehicles such as automobiles and trucks, or in connection with industrial and elevator control systems. Furthermore, my invention is particularly applicable to multiple unit control systems of the pneumatically operated type, although electrically operated systems also fall within its scope and may embody my invention and secure the advantages and benefits thereof to a greater or less extent.

My invention may be best understood by reference to the accompanying drawings in which—

Figure 1 is a diagrammatic view of a control system embodying my invention, the main circuit connections and apparatus together with the auxiliary control devices associated therewith, being illustrated in accordance with the usual practice. The circuit connections of the control devices are omitted for the sake of clearness. Fig. 2 is a diagrammatic view of the control devices and control circuits and includes the control operating-coils and interlock switches shown in Fig. 1 as associated with the main switches and apparatus with which they coöperate. In Fig. 2 the various interlock switches are distributed throughout the diagram in their most convenient positions and no attempt is made to associate them with the particular devices of which they form parts. By such an arrangement, the diagram is greatly simplified and may be readily understood without difficulty and confusion. Fig. 3 is a chart indicating diagrammatically, in a manner well-known to the art, the position of the various switches corresponding to the "running" positions of the "master controller" and the intermediate steps between the several "running" positions.

In describing my invention, I shall first confine myself to the main circuit connections shown in Fig. 1 and the general operation of the system, after which the control circuits shown in Fig. 2 will be set forth and the operation thereof described.

Referring particularly to Fig. 1, the system here shown, comprises a supply circuit conductor marked "Trolley", a return circuit conductor marked "Track", a plurality of motors having armatures $M^1$ and $M^2$ and field windings $F^1$ and $F^2$, a starting resistance "S" connected in series with the motors in the first series position, a plurality of resistors associated with the motor $M^1$ which are respectively adapted to be short circuited by means of electrically operated switches $R^1$, $R^2$ and $R^3$, a plurality of resistors associated with the motor $M^2$ and adapted to be short circuited, respectively, by the electrically operated switches $RR^1$, $RR^2$ and $RR^3$, a plurality of pairs of line switches $LS^1$ and $M^2$ and $LS^2$ and $M^1$, a plurality of motor circuit switches JR and G for controlling the circuit connections of the motors $M^1$ and $M^2$ in changing from series to parallel circuit relation of the motors, an overload tripping device marked "Overload trips" for disconnecting the motors from the "trolley" under conditions of abnormal overload, a switch marked "Line relay" which is maintained in its closed position whenever energy is supplied from the "trolley", an electro-responsive switching device marked "Limit switch" for automatically governing the progression and closure of the resistor short-circuiting switches $LS^2$, $R^1$, $R^2$, $R^3$, $RR^1$, $RR^2$, $RR^3$ and transition switches $M^2$ and G in accordance with predetermined circuit conditions, and a switching device marked "Reverser" for arranging the circuit connections of the motor fields $F^1$ and $F^2$.

For the sake of simplicity and clearness, the several resistors will be designated by the reference characters which are applied to their respective short-circuiting switches, as for example, the resistor short-circuited by the electrically operated switch $R^1$ wil be termed the $R^1$ resistor.

Assuming the various switches and circuit connections to be as shown in Fig. 1, the acceleration of the motors $M^1$ and $M^2$ in the forward direction is accomplished by first closing the switches $LS^1$, $M^1$ and JR, thus completing a circuit from the "trolley" through conductor T, switch 15, "overload trip", switch $LS^1$, starting resistor "S", switch $M^1$, motor armature $M^1$, contact member 16 of the "reverser", field winding $F^1$, contact member 17 of the "reverser", resistors $R^1$, $R^2$, $R^3$, switch JR, resistors $RR^1$, $RR^2$, $RR^3$, motor armature $M^2$, contact member 18 of the "reverser", field winding $F^2$, contact member 19 of the "reverser", "limit switch" and conductor G to the return circuit "track." The motors $M^1$ and $M^2$ are thus connected in series with all of the resistors. The circuit connections just recited correspond to the first "running" position.

Between the first and second "running" positions, the switches $LS^2$, $R^1$, $RR^1$, $R^2$, $RR^2$, $R^3$ and $RR^3$ are successively closed in the order named, thereby gradually short-circuiting and eliminating the corresponding resistors from the circuit and connecting the motors $M^1$ and $M^2$ in series directly across the line.

Between the second and third running positions, the transition of the motors from series circuit relation to multiple circuit relation is effected as follows: Switch J is first closed, thereby completing a short-circuit around the resistors $R^1$, $R^2$, $R^3$, $RR^1$, $RR^2$, $RR^3$ and the switch JR, and eliminating these devices from circuit. Switches $R^1$, $R^2$, $R^3$, $RR^1$, $RR^2$, $RR^3$ and JR are then opened, after which switches G and $M^2$ are closed, while switch J is opened, thus connecting the motors $M^1$ and $M^2$ in parallel across the line with the groups of resistors $R^1$, $R^2$, $R^3$ and $RR^1$, $RR^2$, and $RR^3$ severally in circuit therewith. These connections correspond to the third "running" position or first parallel position. In the subsequent accelerating steps, the resistors $R^1$ to $RR^3$, inclusive, are successively short-circuited until, in the fourth "running" position, the motors $M^1$ and $M^2$ are connected in parallel relation directly across the line, which is the "full speed" position.

All of the apparatus and devices employed are of well-known construction and will not be described in detail, it being understood that they are only illustrative of any suitable devices for accomplishing the same purposes.

The "overload trip" is traversed by the total motor current and is adapted to be actuated when this current exceeds a predetermined amount. Means are associated with the "overload trip" whereby it is retained in an inoperative position after having been operated, until energy has been supplied to its "reset" coil which permits the "overload trip" to return to its normal operative position.

The "reverser" comprises essentially a rotatable drum 21 and a plurality of coöperating stationary contact fingers 22, and is adapted to arrange the circuit connections of the motor fields $F^1$ and $F^2$ for forward or reverse operation of the motors. The "reverser" is provided with a plurality of controlling or actuating electro-magnets $f$ and $r$ for effecting, directly or indirectly, the operation of said "reverser" into its forward or reverse positions.

For simplicity, I have illustrated the electro-magnets $f$ and $r$, as well as the several electro-magnets associated with the various motor circuit and resistor switches, as acting directly upon the devices which they are adapted to actuate, however, I prefer that these devices be actuated pneumatically by means of suitable cylinders and pistons and that the several electro-magnets referred to be employed to govern the operation of the cylinder valves.

The "limit switch" is connected in circuit with the motor $M^2$ in the series and parallel positions and is actuated by the motor current when it is in excess of a predetermined amount. The "line relay" is maintained in its operative position so long as the system, as a whole, receives energy from the supply circuit, but the relay is deënergized under all other conditions.

The resistor switches and the motor circuit switches are adapted to occupy two positions, one in which the switch is opened and termed the "Switch-out" position, and the other in which the switch is closed and termed the "Switch-in" position. Each of the switches referred to is closed when its associated electro-magnet is energized.

Referring now to Fig. 2, the control circuits here shown are arranged and governed by a manually operated switching device termed a "Master controller" which comprises, in general, a rotatable drum having a group 40 of high-voltage contact segments and a group 41 of low-voltage segments and a series 42 of coöperating stationary contact terminals. The "master controller" is adapted to occupy "forward" running positions along the position-indicating lines 1, 2, 3, 4 and "reverse" running positions, correspondingly numbered 1 and 2.

The arrangement of the apparatus and circuits is such that, if the "master controller" be moved to its fourth "forward" operating position, the several motor switches and resistor switches, hereinbefore mentioned, will be operated in a predetermined order, and according to predetermined circuit conditions, to cause the motors $M^1$ and $M^2$ to be automatically and gradually accelerated from rest to their full parallel or "high speed" running condition. If the "master controller" occupies the position 3, 2 or 1, automatic acceleration is secured, and the circuit connections successively arranged up the combination which corresponds to the particular position which the "master controller" occupies. Thus, it is evident that a complete automatic operation, including the necessary elimination of resistors and transition connections in changing the motors from series to parallel circuit relation, may be obtained, or, the operation may be arrested at any of the three intermediate running positions.

Assuming that the "control switch" is closed to the left and that the "master controller" occupies its first "forward" position, energy is supplied from the "trolley" through conductor T, "control switch", conductor $T_1$, contact terminal $T_1$, group of contact segments 40 and corresponding stationary terminal 42 of the "master controller" to contact terminal 5 and thence, through "train line" and conductor 5 to one of a resistor termed "Control resistance", the other end of which is connected to the ground connection G.

The "control resistance" may be of any desired amount and is connected directly between the "trolley" and the "track" and is also provided with intermediate taps to which three auxiliary control circuits 60, 7 and G are respectively connected. In ordinary practice when 600 volts is employed upon the "trolley", the auxiliary control circuit 60 will be connected to the mid-point of the "control resistance" and the control circuit 7 half way between the circuit 60 and the ground. Thus, with none of the electro-magnets connected to the auxiliary control circuits, a voltage of approximately 150 volts exists between the middle or neutral wire 7 and either of the outer circuits 60 or G.

The control circuit 60 is made up of several sections or conductors 61, 62 and 63 and the control circuit 7 includes conductors 71 and 72. Furthermore, control circuit 7 is connected to a contact terminal 7 of the "master controller" through a "train line" 7, so that, in the first position of the controller, relatively low-voltage energy is transmitted to the conducting segments 41 thereof through contacting finger 7, and is supplied to the actuating coil of switch $LS^1$ through contact terminal and conductor F, interlock switch 45 of the "reverser", conductor 10, switch member 46 of the "overload trip" and the ground connection G. Thus, switch $LS^1$ is closed by its electromagnet, after which, a circuit is completed from auxiliary control circuit 60 through contact member 47 of the "line relay", conductor 61, interlock switch $LS^1$—in, conductor 62, interlock switch J—out, conductor 63, actuating coil JR, conductor 64, and interlock switch $M^2$—out to conductor 72 of the neutral auxiliary control circuit 7. A circuit is also completed from control wire 7 through contact member 48 of the "line relay", conductor 71, interlock switch $LS^1$—in, conductor 72 and actuating coil $M^1$ to the ground conductor G. Thus, the switches JR and $M^1$ are closed, thereby establishing the main motor circuit connections for the first running position, as hereinbefore described. If now, the "master controller" be moved to its second "forward" position, energy is supplied from contact terminal 7 through conducting segments 41, contact terminal 1, conductor 1, interlock switch JR—in, interlock switch $M^1$—in, contact member 49 of the "limit switch", interlock switch $LS^2$—out, conductor 12, contact member 50 of the "overload trip", conductor 13 and actuating coil $LS^2$ to conductor G. Thus, if the motor current does not exceed the amount for which the "limit switch" is adjusted, the closure of switch $LS^2$ is effected, thereby short-circuiting the starting resistance S. As soon as the switch $LS^2$ is closed, interlock switch $LS^2$—in transfers the connection of conductor 12 from a circuit through the "limit switch" to conductor 10 which is the "holding" circuit for $LS^2$. At the same time, energy is supplied from the "limit switch" circuit through interlock switch $LS^2$—in, conductor 24, interlock switch $M^2$—out, conductor 25, interlock switch JR—in, conductor 26, interlock switch $R^1$—out, and actuating coil $R^1$, to the auxiliary control circuit 63. Upon completion of the circuit just recited, resistor switch $R^1$ is closed and resistor $R^1$ short-circuited. As switch $R^1$ closes, connections are transferred from conductor 26 to a "holding" circuit 72 by means of interlock switch $R^1$—in. Also, interlock switch $R^1$—in connects conductor 26 to conductor 28 which supplies energy to the actuating coil of switch $RR^1$ through interlock switch $RR^1$—out and conductor 29. Switch $RR^1$ then closes. In this manner, the remaining switches $R^2$, $RR^2$, $R^3$ and $RR^3$ are closed successively, their connections being progressively changed over to holding circuits from the neutral control circuit 7 and energy being progressively supplied to the adjacent actuating coils by means of the several interlock switches. It should be noted, however, that the energy supplied to the actuating coils of the several switches traverses the "limit switch" circuit and hence, is rendered dependent upon the automatic operation of the "limit switch" in accordance with well known principles. Therefore, the successive closure of the resistor short-circuit switches can only be accomplished in a predetermined order and, after the motor current has decreased to a predetermined amount, thus, preventing injury to the motors $M^1$ and $M^2$. When the resistor switches $R^1$ to $RR^3$, inclusive, have been closed, all of the resistors are excluded from the circuit and the motors are connected directly across the line in a full series position corresponding to the second running position of the "master controller".

It will be noted that, after the closure of the switch $RR^2$, energy is supplied through interlock switch $RR^2$—in and conductor 35 simultaneously to the actuating coils $R^3$ and $RR^3$, so that the switches $R^3$ and $RR^3$ are closed concurrently. As the switch $R^3$ is closed, a holding circuit is established through interlock switch $R^3$—in to control circuit 7, while "train line" and conductor P are connected through interlock switch $R^3$—in, conductor 36, interlock switch G—out and the actuating coil of switch J to the control circuit G. However, as long as the "master controller" occupies its second "forward" position, the "train line" and conductor P are not energized, so that further automatic operation of the system is prevented. However, if the "master controller" is moved to its third running position or if it occupies its fourth running position, energy is supplied from the "master controller" through "train line" and conductor P and the circuit just recited to the actuating coil of switch J. The switch J is then closed and "held in" from control circuit 7 through interlock J—in. Immediately upon the closure of switch J the auxiliary control circuit 60 is opened through interlock switch J—out and hence, the actuating coils of switches JR and $R^1$ to $RR^3$ inclusive are deënergized, thereby permitting their associated switches to be opened. At the same time, interlock switch J—in completes a circuit from conductor P through the "limit switch" and thus energizes conductor 25 through interlock switches $LS^2$—in and $M^2$—in, dependent upon the operation of the "limit switch." As soon as the switch JR opens, therefore, its interlock switch JR—out completes a circuit from conductor 25 through conductor 73 and the actuating coils of switches G and $M^2$ to the control circuit G. Interlock switch JR—in thus interrupts the "limit switch" circuit between conductor 1 and P. Switches G and $M^2$ are then closed and, in so doing, switch J is permitted to open, inasmuch as its energizing circuit is interrupted through interlock switch G—out. The circuit connections are now arranged for parallel operation of the motors $M^1$ and $M^2$ with resistors $R^1$ to $R^3$, inclusive, and $RR^1$ to $RR^3$, inclusive, severally in circuit therewith. If now, the "master controller" be moved to its fourth or last operating position, or if it already occupies that position, energy is delivered from the "master controller" through conductor 1, interlock switch G—in, interlock switch $M^1$—in, contact member 49 of the "limit switch", interlock switch $LS^2$—in, conductor 24, interlock switch $M^2$—in, conductor 26, interlock switch $R^1$—out, and actuating coil $R^1$ to control circuit conductor 60. Thus, switch $R^1$ is closed and its corresponding resistor excluded from circuit as soon as the motor current traversing the "limit switch" has been reduced to a predetermined amount. Inasmuch as the "limit switch" is connected only in the motor circuit of motor $M^2$, it is evident that switch $RR^1$ closes practically simultaneously with switch $R^1$. Switches $R^2$ to $RR^3$ are subsequently closed in pairs and in succession in accordance with predetermined current conditions and in a manner similar to that already described and, on account of the similarity and simplicity of the circuits and operation, no further description thereof is deemed necessary. Thus, the automatic operation of the system progresses until all of the resistors are excluded from the circuit and the motors $M^1$ and $M^2$ are connected directly across the line, which corresponds to the fourth or "full speed" position.

From the foregoing description, it is evident that the motors $M^1$ and $M^2$ may be accelerated from rest to full speed entirely automatically and independently of the operator, provided the "master controller" is moved to its fourth position. Similarly, automatic acceleration of the motors may be secured corresponding to any of the other running positions of the controller.

It will also be understood that the operation of the system, as hereinbefore described, is dependent upon the action of the "overload trip" and the "line relay" and that, in case of sufficient overload from a ground or a short-circuit to actuate the "overload trip", or in case of failure of voltage, the "overload trip" or the "line relay" will perform its functions and prevents further operation of the system. If the "overload trip" is actuated it is retained in its inoperative position until its "reset" coil is energized by means of closing the "control switch" to the right, thereby supplying energy from the conductor T through the "control switch", conductor and "train line" 8, "reset resistance" and "reset" coil to control circuit G. In moving the "control switch" to its right position, the auxiliary control system is entirely deënergized and the automatic operation must again be effected from the beginning.

In the operation of the system, it will be noted that all of the resistor short-circuiting switches $LS^2$, $R^1$ and $RR^3$, inclusive, and transition switches $M^2$ and G are closed only in accordance with the action of the "limit switch." Furthermore, the actuating coils of all of the switches are divided into substantially equal groups, which groups are severally connected in their "holding-in" positions between the neutral or common auxiliary circuit 7 and the respective outer auxiliary circuits 60 and G. Hence, in the "full series" or "full parallel" positions, the load on the auxiliary control system is divided approximately equally between the two legs of the three-wire system hereinbefore described. Under normal operating conditions, with 600 volts on the supply circuit and substantially all of the switches closed, the voltage between the control circuit 7 and circuit 60 or G is approximately 90 volts. The several electro-magnets associated with these switches may be so designed as to actuate positively over a range of from 30 to 90 volts, so that, if the voltage of the supply circuit should drop even to 200 volts, the operation of the system would still be positive and reliable. Furthermore, all of the "train lines" and control circuits, with the exception of the "reset" line and line 5, together with their connected circuits, are relatively low-voltage circuits, and the interlock switches are not required to interrupt any high-voltage currents.

The control system hereinbefore described may also be adapted for reverse operation of the motors by moving the "master controller" to either of its two "reverse" positions, and, in such case, the "reverser" will be actuated to its "R" position in which the connections of the motor field $F^1$ and $F^2$ are reversed. Otherwise, the operation of the system is entirely similar to that hereinbefore described and no description thereof will be given.

Although I have shown and described my invention as embodying a two motor equipment having a specific arrangement of apparatus and circuit connections, and as operating in a definite manner, it will be understood that four or any other number of motors may be employed and many variations may be effected in the connections and operations set forth which do not depart from the spirit of my invention, and I desire that only such limitations shall be imposed as are indicated in the appended claims.

I claim as my invention:

1. In a control system, the combination with a supply circuit, an electric motor adapted to be connected thereto, and a plurality of resistors associated with said motor, of an auxiliary low-voltage control system, means for connecting said system to said supply circuit, a governing controller for said auxiliary control system, and means for effecting automatic acceleration of said motor.

2. In a system of control, the combination with a supply circuit, a plurality of electric motors adapted to receive energy therefrom, and a plurality of resistors associated with each motor, of a relatively low-voltage auxiliary control system, connected to said supply circuit and embodying means for automatically arranging the circuit connections of said motors and resistors to secure a uniform acceleration of said motors.

3. In a system of control, the combination with a supply circuit, a plurality of electric motors adapted to receive energy therefrom, and a plurality of resistors associated with each motor, of a control resistor connected to said supply circuit, a plurality of electrically controlled switches for effecting changes in the circuit connections of said motors and said motor resistors, and relatively low-voltage auxiliary control circuits connected to taps in said control resistor for energizing said electrically controlled switches, and means for effecting automatic acceleration of said motors.

4. In a system of control, the combination with a supply circuit, a plurality of electric motors adapted to receive energy therefrom, and a plurality of resistors associated with each motor, of a control resistor connected to said supply circuit and having a plurality of taps, a plurality of auxiliary switches and control circuits connected to said taps, and means associated with said control circuits for automatically governing the circuit connections of said motor and said motor resistors.

5. In a control system, the combination with a supply circuit, a plurality of motors adapted to receive energy therefrom and to be arranged for series-multiple operation, of a relatively low-voltage auxiliary control system connected to said supply circuit and embodying means for effecting an automatic and predetermined operation of said motors.

6. In a control system, the combination with a supply circuit, a plurality of motors adapted to be connected thereto, and a plurality of resistors, of automatic means embodying a low-voltage auxiliary control system that is connected to said supply circuit and that embodies pairs of control circuits for arranging the circuit connections of said motors and resistors in changing said motors from series to parallel circuit relations.

7. In a "bridging" control system, the combination with a supply circuit, a plurality of motors connected thereto, and switches and connections for changing said motors from series to multiple relation without interrupting the torque of any of said motors, of automatic means for effecting said circuit changes in accordance with predetermined circuit conditions, and a derived source of low-voltage energy for supplying said automatic means.

8. In a control system, the combination with a supply circuit, a plurality of motors, and a plurality of resistors, of an energy-consuming device connected to said supply circuit, a plurality of auxiliary control switches connected to said device, and a plurality of electrically controlled switches for arranging the circuit connections of said motors and said resistors, said electrically controlled switches being energized from different pairs of said controlled circuits, and automatic means for governing the operation of said switches.

9. In a system of control, the combination with a supply circuit, a plurality of motors and resistors, and switches for effecting the connections of said motors and resistors, of a three-wire auxiliary low-voltage control system deriving energy from said supply circuit, a plurality of electro-magnets for said switches adapted to be connected in substantially equal groups between different pairs of said auxiliary control circuits, and means for effecting an automatic acceleration of said motors in accordance with predetermined conditions.

10. In a system of control, the combination with a supply circuit, a plurality of motors and resistors adapted to be connected thereto, a plurality of switches for effecting circuit connections of said motors and said resistors, of a low-voltage auxiliary source of energy connected to said supply circuit, three control circuits severally connected to taps therein, a plurality of groups of electro-magnets for said switches severally connected between different pairs of said control circuits, and means for automatically effecting the operation of said switches in a predetermined order and in accordance with predetermined conditions.

11. In a system of control, the combination with a supply circuit, a plurality of motors and resistors adapted to be connected thereto, and a plurality of switches for effecting circuit connections of said motors and said resistors, of three auxiliary control circuits receiving low-voltage energy from a derived source, a group of electro-magnets for said resistor switches connected between a pair of said control circuits, a second group of electro-magnets for said motor switches connected between another pair of auxiliary control circuits, and automatic means for governing the operation of said switches.

12. In a control system, the combination with a supply circuit, a plurality of motors and resistors connected thereto, a three-wire auxiliary control circuit, deriving low-voltage energy from said supply circuit, and a plurality of switches for arranging the connections of said motors and resistors, of a plurality of electro-magnets for said switches adapted to be connected in two groups between the respective outer control circuits and the neutral circuit, a manually operated switching device electrically connected to said neutral circuit and adapted to arrange the connections of said electro-magnets, and automatic electro-responsive means in circuits with a portion of said electro-magnets for governing the operation of said switches.

13. In a control system, the combination with a supply circuit, a plurality of motors and resistors adapted to be connected thereto, a plurality of switches for arranging the connections of said motors and resistors and electro-magnets associated with each of said switches, of a control resistor connected to said supply circuit, a three-wire low-voltage control system connected to said control resistor for supplying energy to said electro-magnets, and means for effecting automatic operation of said switches in a predetermined order.

14. In a control system, the combination with a supply circuit, a plurality of motors and resistors adapted to receive energy from said supply circuit, and a plurality of electrically controlled switches for arranging the connections of said motors and resistors, of a control resistor connected to said supply circuit, three auxiliary control circuits connected to taps therein and supplied with relatively low voltage, a master controller connected to the middle control circuit and adapted to govern the supply of energy for operating substantially all of said electrically controlled switches, and means for automatically shifting the connections of substantially all of said switches from the controller circuit to the middle auxiliary control circuit for "holding in" said switches when closed, said switches being divided between the middle circuit and the respective outer circuits.

In testimony whereof, I have hereunto subscribed my name this 7th day of Feb., 1913.

ARTHUR J. HALL.

Witnesses:
 E. A. McELHENY,
 B. B. HINES.

Copies of this patent may be obtained for five cents each, by addressing the "Commissioner of Patents, Washington, D. C."